(12) United States Patent
Yen et al.

(10) Patent No.: US 7,721,601 B2
(45) Date of Patent: May 25, 2010

(54) HYDROGEN STORAGE TANK AND METHOD OF USING

(75) Inventors: David W. Yen, Dayton, OH (US);
JingYing Zhang, Kirkland, WA (US);
Peter J. Schubert, Naperville, IL (US)

(73) Assignee: Packer Engineering, Inc., Naperville, IL (US)

( * ) Notice: Subject to any disclaimer, the term of this patent is extended or adjusted under 35 U.S.C. 154(b) by 431 days.

(21) Appl. No.: 11/764,341

(22) Filed: Jun. 18, 2007
(Under 37 CFR 1.47)

(65) Prior Publication Data
US 2010/0024542 A1 Feb. 4, 2010

Related U.S. Application Data

(60) Provisional application No. 60/814,435, filed on Jun. 16, 2006.

(51) Int. Cl.
*G01F 23/00* (2006.01)
(52) U.S. Cl. .......................................... 73/292; 73/291
(58) Field of Classification Search .................. 73/292, 73/291, 299, 295
See application file for complete search history.

(56) References Cited

U.S. PATENT DOCUMENTS

| | | | | |
|---|---|---|---|---|
| 4,265,720 A | * | 5/1981 | Winstel | 205/637 |
| 2004/0241507 A1 | * | 12/2004 | Schubert et al. | 429/19 |
| 2007/0059859 A1 | * | 3/2007 | Lysenko et al. | 438/99 |

* cited by examiner

*Primary Examiner*—Hezron Williams
*Assistant Examiner*—Nathaniel Kolb
(74) *Attorney, Agent, or Firm*—Hartman & Hartman, P.C.; Gary M. Hartman; Domenica N.S. Hartman

(57) ABSTRACT

A hydrogen storage tank for containing solid-state hydrogen storage media, and method for determining the hydrogen fill level in the tank. The tank has at least one compartment for storing the storage media, passages for transporting hydrogen gas to and from the compartment, and a heat distribution system for establishing a substantially uniform temperature in the storage media. A look-up table is generated for the tank that relates hydrogen pressure changes in the tank versus hydrogen fill levels in the tank as a function of temperature. The tank is filled to full capacity by adsorbing hydrogen on the storage media. Thereafter, hydrogen is released from the storage media for a time period during which there is a substantially constant demand on the tank, the change in pressure of the released hydrogen gas is measured, and the look-up table is applied to determine the hydrogen fill level in the tank.

33 Claims, 2 Drawing Sheets

HYDROGEN STORAGE TANK AND METHOD OF USING

CROSS REFERENCE TO RELATED APPLICATIONS

This application claims the benefit of U.S. Provisional Application No. 60/814,435, filed Jun. 16, 2006, the contents of which are incorporated herein by reference.

STATEMENT REGARDING FEDERALLY SPONSORED RESEARCH

This invention was made with United States Government support from Edison Materials and Technology Center (EMTEC), Contract No. EFC-H2-3-1C. The Government has certain rights in this invention.

BACKGROUND OF THE INVENTION

The present invention relates to hydrogen storage tanks and methods. More particularly, this invention relates to hydrogen storage tank adapted to contain solid-state hydrogen storage media, such as nano-porous silicon (npSi), and to methods for determining fill levels in such tanks.

Hydrogen-based fuel cell technologies are being considered for a wide variety of power applications, including but not limited to mobile applications such as vehicles as an attractive alternative to the use of petroleum-based products. Hydrogen-based fuel cells are also readily adaptable for use as energy sources in numerous and such diverse applications as cellular phones to space ships. They have the further desirable attribute of producing water vapor as their only byproduct and are thus environmentally benign. However, hydrogen storage remains a challenge because of its very low heat value per volume compared to fossil fuels. As such, efficient storage of hydrogen is vitally important for cost-effective system implementation. When compared to storage for conventional chemical fuels or electric energy sources, existing hydrogen storage technologies lack the convenience of gasoline for delivery and storage capacity (energy density per unit weight), and lack the flexibility of electrical energy stored in batteries and capacitors. Therefore, for fuel cells to reach their full commercial potential, improved hydrogen storage technologies are needed.

Prior methods of storing hydrogen fall broadly into two categories. The first category involves storing hydrogen chemically within a convenient chemical molecule, usually an aliphatic organic compound such as methane, octane, etc., and then pre-processing the fuel as needed, such as by catalytic reforming, to release elemental hydrogen plus carbon oxides. This method suffers two important drawbacks: carbon dioxide byproduct is a "greenhouse gas" that some believe contributes to global warming and is therefore environmentally undesirable; and the additional weight of the chemical molecule and the reformer reduce the efficiency of the entire process, making it less attractive from a cost and performance standpoint.

The second category involves mechanical or adsorptive storage of elemental hydrogen in one of three forms: compressed gas, cryogenically-refrigerated liquid, or chemisorbed onto active surfaces. Of these methods, compressed gas storage is the most straightforward and is a mature technology. However, compressed gas cylinders are quite heavy, needing sufficient strength to withstand pressures of many thousands of pounds per square inch. This weight is a considerable drawback for portable applications, and in any usage compressed gas cylinders must be treated with care because they represent a safety hazard.

Cryogenic storage of hydrogen is also well known, being used in industrial plants and as a rocket fuel. Liquid hydrogen is remarkably dense from a specific energy point of view (kilowatts per kilogram), but requires a considerable amount of additional energy to maintain the nearly absolute zero temperatures needed to keep hydrogen in a liquid state. Liquid hydrogen also requires a heavy mass of insulation, and these factors conspire to make cryogenic storage impractical for portable and small-scale applications.

Chemisorption as used herein means the adsorption of a given molecule onto an active surface, typically of a solid or a solid matrix. Chemisorption is typically reversible, although the energy of adsorption and the energy of desorption are usually different. Various catalysts and surface preparations are possible, providing a wide range of possible chemistries and surface properties for a given storage problem. Chemisorption of hydrogen has been studied extensively, and substances such as metal hydrides, palladium, and carbon nanotubes or activated carbon have been used to adsorb and desorb hydrogen. In particular, hydrogen storage in absorbed solids such as metal hydrides, metal oxides and other inorganic surfaces, carbon nanotubes/fibers, carbon fullerene, etc., has recently been considered as a promising method with the advantages of high volumetric hydrogen density and improved safety. However, prior hydrogen chemisorption techniques with these solid-state storage media have fallen short of the goals of efficiency, convenience, and low system cost for several reasons.

In the case of metal hydrides, metal oxides, and other inorganic surfaces, storage efficiencies typically are relatively low and the adsorption/desorption process is highly dependent upon exacting chemistry. These factors combine to make such approaches less than sufficiently robust for many commercial applications. Even so, metal hydrides are considered leading candidates for hydrogen storage. However, metal hydride materials expand during hydriding cycles to the extent that large stresses are generated on the material (typically particles) and the hydriding container, such that stringent requirements are imposed in container design. Furthermore, these stresses tend to fragment the metal hydride particles into finer and finer powders in an uncontrollable manner, resulting in material movement and segregation in the storage container, an increased tendency for entrainment of hydride fines in the hydrogen gas streams released from the particles, and the risk of plugged gas filters and high internal pressures within the hydriding container. Secondly, hydrogen charging (adsorption) and release (desorption) require heating of the metal hydride particles at a level of about 14.6 MJ/kg, which poses a significant thermal management challenge and leads to slow refueling.

In other materials, such as carbon nanotubes, the efficiency of hydrogen adsorbed per unit weight of matrix is higher than metal hydrides, metal oxides, and other inorganic surfaces, but desorption requires high temperatures that raise the risk of combustion. Additionally, the present cost of carbon nanostructures is relatively high, and control over material properties can be quite difficult in high-volume manufacturing.

Hydrogenated surfaces in silicon have also been employed, as disclosed in US. Pat. Nos. 5,604,162, 5,605,171, and 5,765,680, the disclosures of which are incorporated herein by reference. In each of these references, the adsorbed molecule is the radioactive hydrogen isotope tritium ($^3$H), and the objective is the storage of this isotope to enable its safe transport, typically to a waste handling or storage facility, or to serve as a means for providing radioactive energy to power a light source. These prior methods of chemisorption do not, however, provide for desorption of hydrogen from a silicon storage medium. In fact, conventional methods of chemisorption are generally designed to prevent desorption. Further, these conventional methods of chemisorption fail to teach methods by which the storage capacity of a silicon matrix can be increased.

As a solution to the forgoing, a system for storage and retrieval of elemental hydrogen on a porous silicon media is described in U.S. Published Patent Application No. 2004/0241507 to Schubert et al., the disclosure of which is incorporated herein by reference. As a solid-state hydrogen storage media, nano-porous silicon (npSi) has a theoretical hydrogen capacity of about 6.6 weight percent, and has unique characteristics capable of enhancing hydrogen charging and recharging processes. As such, there is a need for hydrogen storage tanks adapted for containing npSi, as well as methods for their use and operation.

BRIEF SUMMARY OF THE INVENTION

The present invention is directed to hydrogen storage tanks adapted to contain solid-state hydrogen storage media, such as nano-porous silicon (npSi), and methods for determining hydrogen fill levels in such tanks.

According to one aspect of the invention, a hydrogen storage tank is provided having a plurality of separate compartments for storing the storage media. Passages are provided for transporting hydrogen gas to the tank and into each compartment and for transporting hydrogen gas out of each compartment. Heat is distributed within and among the compartments so as to enable establishing a substantially uniform temperature in the storage media within the compartments. Means is provided for desorbing hydrogen from the storage media, and a sensor senses the pressure of hydrogen gas released from the storage media within the compartments.

According to another aspect of the invention, a method for determining the hydrogen fill level in a hydrogen storage tank entails configuring the tank to have at least one compartment for storing the storage media, passages for transporting hydrogen gas to the tank and into the compartment and for transporting hydrogen gas out of the compartment, and means for distributing heat within the compartment so as to establish a substantially uniform temperature in the storage media within the compartment. A look-up table is generated for the tank that is derived from a series of plots relating changes in pressure of the hydrogen gas in the tank versus fill levels of hydrogen in the tank as a function of temperature. The tank is filled to full capacity by flowing hydrogen gas through the passages and into the compartment so as to adsorb hydrogen on the storage media. Thereafter, hydrogen is released from the storage media for a time period during which there is a substantially constant demand on the tank, the change in pressure of the hydrogen gas released from the storage media is measured during the time period, and the look-up table is applied to determine the hydrogen fill level in the tank.

Other objects and advantages of this invention will be better appreciated from the following detailed description.

DETAILED DESCRIPTION OF THE INVENTION

Figure 1:
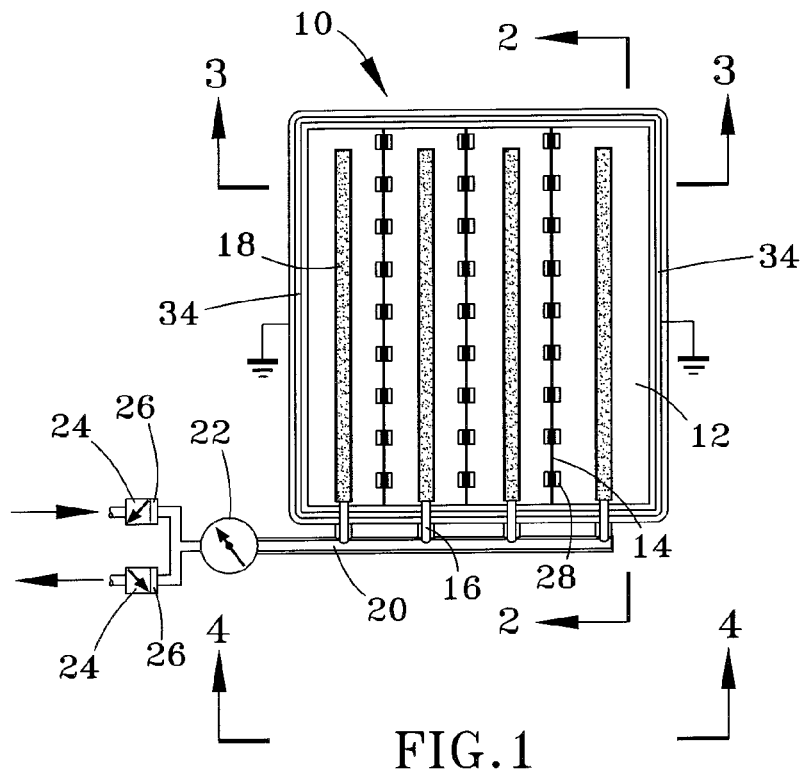
FIG. 1 schematically represents a cross-sectional view of a hydrogen storage tank adapted to contain porous silicon according to a first embodiment of the invention.

The present invention provides hydrogen storage systems with particular application for automotive fuel cells. The storage systems include integrated storage tanks adapted to contain solid-state storage media, including but not limited to nano-porous silicon (npSi) powders. The tanks are equipped with heat distribution systems, light sources, and electric field generators to facilitate hydrogen charge and discharge processes and fill level checks carried out with the tanks. An algorithm is preferably employed to determine the fill level of hydrogen in the tanks.

FIGS. 1 through 4 depict a first configuration of such a hydrogen storage tank 10. The tank 10 is divided into several compartments 12 by dividers 14 shown as extending the full height of the tank 10 so that the compartments 12 are substantially parallel to each other. Each compartment 12 is adapted to contain a solid-state storage media such as a npSi powder. The tank 10 is equipped with hydrogen inlet/outlet ports 16 for transporting hydrogen gas to each compartment 12 to allow for adsorption of hydrogen on the storage media, and for transporting hydrogen gas from the compartments 12 following desorption of hydrogen from the storage media. Each port 16 is outfitted with a porous filter 18 that extends into its corresponding compartment 12 to trap contaminants that might otherwise be transported to and from the compartments 12 with the hydrogen gas. As shown, the porous filters 18 can extend nearly the full length of each compartment 12 to facilitate the flow of hydrogen gas. A hydrogen manifold 20 interconnects the ports 16, and a flow meter or pressure sensor 22 is connected to the hydrogen manifold 20 to enable monitoring of the hydrogen gas entering and leaving the tank 10. The manifold 20 is preferably provided with a check valve 24 with an integrated flow sensor 26 to help prevent backwash of contaminants into the tank 10.

The tank 10 is also preferably equipped with light sources, such as an infrared (IR) emitter 28, mounted on both sides of each divider 14 for the purpose of generating photons within each compartment 12. Because silicon is at least partially transparent to light in the infrared region (wavelengths of about 700-5000 nm) and hydrogen has a prime absorption peak at a wavelength of about 660 nm and therefore adsorbs light in this region of the infrared spectrum, photon energy can be effectively used to promote the release of hydrogen from npSi contained within the compartments 12. The IR emitters 28, which preferably emit light in wavelengths of about 100 to about 850 nm, can have a variety of configurations, for example, a diffuse light source with a homogeneous illumination capability, a directed light source that is lensed and tailored to the geometry of the tank 10, and/or a series of light sources that are individually controlled to give greater spatial control of hydrogen release from npSi. The distribution density of the IR emitters 28 within the tank 10 may be determined by its penetration capability though npSi.

Figure 2:
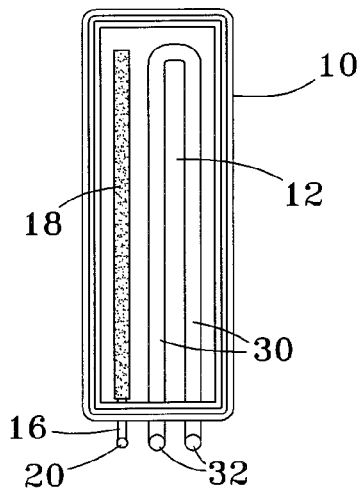
FIGS. 2 and 3 schematically represent cross-sectional views of the hydrogen storage tank taken along section lines 2-2 and 3-3 of FIG. 1.
Figure 3:
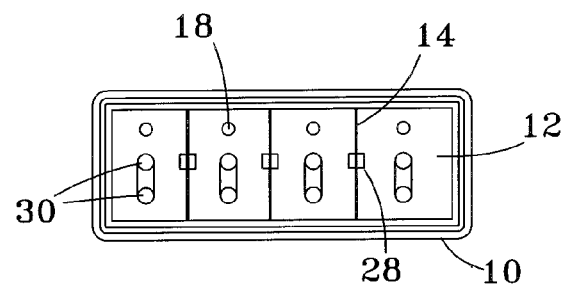
Figure 4:
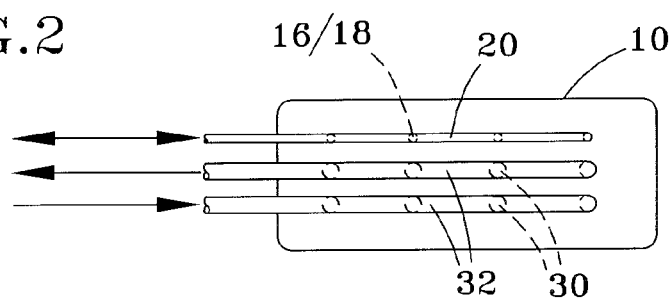
FIG. 4 schematically represents an end view of the hydrogen storage tank as viewed from line 4-4 of FIG. 1.

In FIGS. 2 and 4, the tank 10 can be seen to contain U-shaped heat exchanger tubes 30 located within each compartment 12. The tubes 30 form part of a heat distribution system for the tank 10 intended to maintain a substantially uniform temperature throughout each compartment 12 and among the several compartments 12. In particular, the tubes 30 can be used to remove heat from the compartments 12 during the hydrogen adsorption process, and to import waste heat from the fuel cell for use during the desorption process. The ends of each U-shaped tube 30 are connected to either an inlet or outlet coolant manifold 32, as seen in FIGS. 2 and 4 (the tubes 30 and their manifolds 32 are omitted from FIG. 1 for clarity.) The type of coolant, the number of heat exchanger tubes 30, the diameters of the tubes 30 and manifolds 32, the coolant flow rate, inlet temperatures, etc., can be selected by those skilled in the art to achieve minimum refueling time and maximum gravimetric efficiency for the tank 10.

According to an optional aspect of the invention, electric fields can be applied to modify the surface energy of the silicon within the tank 10. Depending on whether an adsorption or desorption cycle is being performed, the electric fields can be employed to either loosen or strengthen the bonds between hydrogen and the storage media, and thereby facilitate the charging and discharging of hydrogen from the tank 10. The electric fields can be generated field plates having a variety of configurations, including large field plates 34 on opposite sides of the tank 10 as shown in FIG. 1, field plates integrated within the compartments 12, or a series of field plates that, in a preferred embodiment, enable finer control over hydrogen release.

An npSi material in the form of powders within the compartments 12 may be suspended in a heat-conductive foam (not shown) that forms part of the heat distribution system for the tank 10 to maintain a uniform temperature throughout each compartment 12 and among the several compartments 12. However, by accommodating a heat-conductive foam within the compartments 12, the powder packing density within each compartment 12 may be limited, hence lowering the volumetric percentage of hydrogen capacity of the tank 10.

Figure 5:
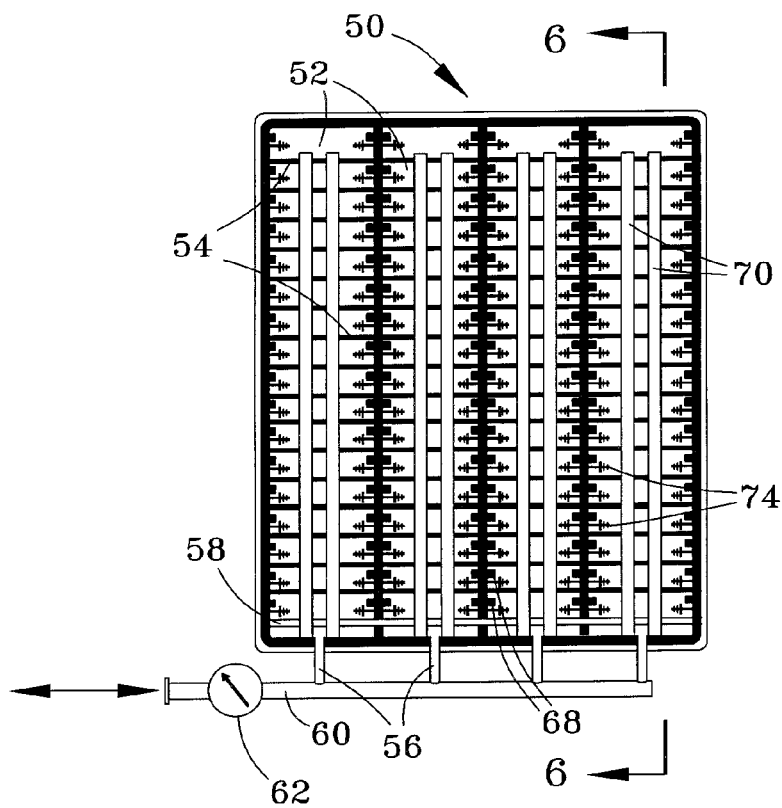
FIG. 5 schematically represents a cross-sectional view of a hydrogen storage tank adapted to contain porous silicon according to a second embodiment of the invention.
Figure 6:
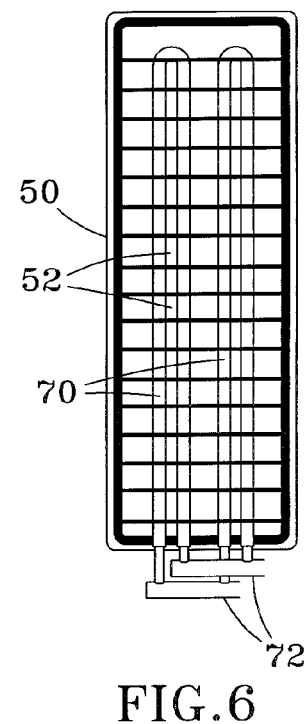
FIG. 6 schematically represents a cross-sectional view of the hydrogen storage tank taken along section line 6-6 of FIG. 5.

FIGS. 5 and 6 schematically illustrates a second configuration of a hydrogen storage tank 50 that differs from that of FIGS. 1 through 4 with respect to the techniques employed for packing of the storage media and heat distribution within the storage media. In FIG. 5, npSi powders (not shown) are packed within individual packing cells or boxes 52, which in turn are individually stacked in columns within the hydrogen storage tank 50. Inlet/outlet ports 56 connected to a hydrogen manifold 60 (shown only in FIG. 5 for clarity) are provided for distributing hydrogen to each box 52 for adsorption by the npSi powders within the boxes 52, and subsequently removing the hydrogen desorbed by the npSi powders. A layer of filter material 58 is located between the ports 56 and the boxes 52 to trap contaminants that might be entrained in the hydrogen flowing to and from the boxes 52. In the embodiment shown in FIGS. 5 and 6, the boxes 52 are required to be made of a porous material, such as a sintered material that is sufficiently porous to provide hydrogen flow channels therethrough. Alternatively, the tank 50 is required to include porous filter tubes connected to the ports 56 to enable hydrogen flow to and from the boxes 52, similar to the tubes 18 shown in FIG. 1.

Each box 52 includes holes for the insertion of two sets of U-shaped cooling tubes 70. The inlet and outlet ends of each cooling tube 70 are coupled to either an inlet or outlet manifold 72 (shown only in FIG. 6 for clarity). The tubes 70 are tightly fitted to the holes in the boxes 52 during assembly to form an effective tube-fin system with good thermal contact and heat transfer characteristics. In addition to being porous, preferred materials for the packing boxes 52 are thermally conductive to enable the walls 54 of the boxes 52 to function as thermal conducting fins in combination with the cooling tubes 70. A light source, such as IR emitters 68, and an electric field plate 74 are preferably installed at each box 52 for effective spatial control of the charging and releasing processes. Optimal sizes for the boxes 52 are determined in part by the heat conductivity, light penetration capability, and electrical field distribution made possible by the materials from which the boxes 52 are made, the type and strength of the IR emitters 68, and strength of the electric field generated by the field plates 74.

The tank 50 illustrated in FIGS. 5 and 6 has two notable advantages. First, the assembly process for the tank 50 is uncomplicated and the powder packing density within each box 52 can be easily controlled. Secondly, because direct handling of very fine npSi powders might pose possible health problems, the powders can be packed in the boxes 52 as part of the manufacturing process, reducing the potential for human exposure to the powders and facilitating transport of the powders to the assembly site of the hydrogen storage tank 50. The tank 50 can also be modified to include, for example, an integrated tube-fin system that contacts the boxes 52 and promotes heat transfer throughout the interior of the tank 50, and optionally a light source and/or electric field plate installed on each of these fins.

The external geometries of both tanks 10 and 50 can be optimized for performance and for the space available in the intended application, such as a vehicle. As shown in FIGS. 1 through 6, the hydrogen storage tanks 10 and 50 can have rectangular external shapes with rounded edges to fit within a rectangular vehicle space and minimize stress concentrations, though it should be recognized that other tank geometries and non-uniform shapes are also within the scope of the invention. IR emitters 28 and 68 and electrical field plates 34 and 74 may also be distributed non-uniformly within the tanks 10 and 50 to accommodate various geometrical requirements, so as to substantially achieve the same IR radiation density and electrical strength at all points within the tanks 10 and 50.

A desirable feature for hydrogen storage tanks is the ability to determine the fill level of hydrogen in the tank, both during fueling and to monitor the degradation of the hydrogen storage capacity of the solid-state storage media over time. The tanks 10 and 50 described above are well suited for making such a capability practical. To achieve this functionality, the tank 10/50 is assumed to have an approximately uniform (though not necessarily steady-state) temperature throughout its compartments 12/52 due to the heat distribution capabilities noted above for the tanks 10 and 50. Also consistent with the foregoing, the tank 10/50 preferably has IR emitters 28/68 (or another suitable light source) positioned and having sufficient power so that substantially all regions within the tank 10/50 are exposed to the IR radiation from the emitters 28/68. It is further assumed that, as in the case when npSi is used as the hydrogen storage media, elevated temperatures, IR radiation, and electric fields cause or promote the release of hydrogen from the storage media within the tank 10/50.

The relative fraction of hydrogen released during a given exposure to IR radiation from the emitters 28/68 changes with both the fill level of the tank 10/50 and its temperature, which can be characterized by the change in pressure as measured by the sensor 22/62 at the hydrogen manifold 20/60 of the tank 10/50 when the IR emitters 28/68 are on. Because the effect of IR radiation will change as the fill level changes over time due to hydrogen being drawn from the tank 10/50, a normalized value can be calculated by measuring the change in hydrogen pressure ($\Delta P_{RUN}$) while the IR emitters 28/68 are on for a set period of time, and normalizing this measurement to a change in hydrogen pressure ($\Delta P_{FULL}$) that was measured when the hydrogen fill level within the tank 10/50 was at full capacity, as well as at various known but lesser fill levels. A family of curves can be empirically derived in this manner showing normalized pressure change ($\Delta P_{RUN}/\Delta P_{FULL}$) against fill levels for a variety of temperatures. The data from such curves can be stored in a look-up table, providing the basis for an algorithm by which the approximate fill level within the tank 10/50 can be determined during subsequent operation of a fuel cell (or other device) that draws hydrogen from the tank 10/50.

Figure 7:
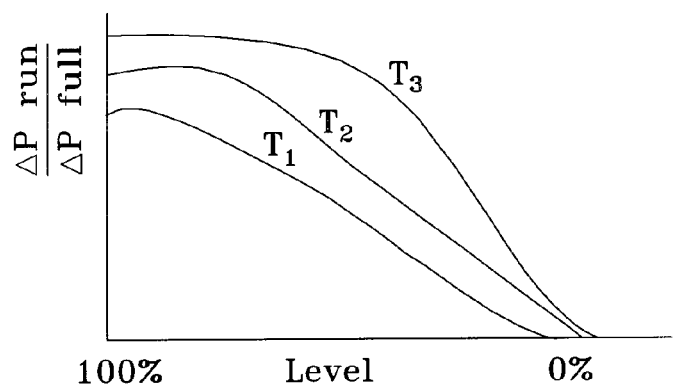
FIG. 7 is a graph depicting a relationship between fill level and pressure change as a function of time within the hydrogen storage tanks of FIGS. 1 through 5.

FIG. 7 represents an example of plots (characterization curves) that constitute such a look-up table, and depicts temperature-dependent relationships between normalized pressure change ($\Delta P_{RUN}/\Delta P_{FULL}$) and fill level within a hydrogen storage tank. Such a look-up table is preferably established for each tank geometry and each type of solid-state media to be used.

Because the capacity of solid-state hydrogen storage media can degrade over time and the capacity of the tank 10/50 can diminish due to poisoning by hydrocarbons, oxygen, water, and nitrous oxides, the algorithm used to determine the fill level is preferably recalibrated each time the tank 10/50 is refilled to capacity (hydrogen is adsorbed on the npSi powder). Recalibration entails measuring the tank hydrogen pressure ($P_{FULL}$) with the sensor 22/62 immediately following each refill of the tank 10/50, and then remeasuring the change in hydrogen pressure ($\Delta P_{FULL}$) with the sensor 22/62 while the IR emitters 28/68 are on for a set period of time.

During subsequent operation of a fuel cell (or other device) that draws hydrogen from the tank 10/50, the fill level within the tank 10/50 can be determined by intermittent flashing of the IR emitters 28/68 at times when the demand for hydrogen from the tank 10/50 is constant, preferably zero. The update rate can be variable, but should not be faster than some minimum time $T_{min}$, which may be in a range of, for example, about 10 to about 100 seconds. As a nonlimiting example, the update rate could be about 180 seconds, during which the emitters 28/68 might be on for about 15 seconds. While the interior of the tank 10/50 is subjected to IR radiation from the emitters 28/68 for a specified period of time, the change in hydrogen pressure ($\Delta P_{RUN}$) is measured with the sensor 22/62, and the measured pressure change is normalized to the pressure change ($\Delta P_{FULL}$) measured when the tank 10/50 was last refilled to capacity. Thereafter a fill level can be determined by comparing the normalized value to the characterized values in the look-up table. The result can be reported as a fill level to the storage system and the hydrogen tank user.

To aid in the understanding of the concept, a pseudocode for preparing a software or hardware implementation of this algorithm is shown below in Table I.

TABLE I

Fill the tank
   Set Level = 100%
   Apply heat to the tank, preferably to steady state
   Measure pressure at constant demand = $P_{FULL}$
   Turn on IR emitters
   Measure pressure change $\Delta P_{FULL}$ TABLE I-continued Turn off IR emitters
Perform diagnostics on the tank condition: check if $\Delta P_{FULL}$ is low
During fuel cell operation:

When T > $T_{min}$ AND demand is relatively constant
Turn on IR emitters
Measure $\Delta P_{RUN}$
Turn off IR emitters
Compute $\Delta P_{RUN}/\Delta P_{FULL}$ and look up value on characterization curves
Determine fill level and output to the system/users
Continue It should be noted that the capability for determining fill level with the present invention is not strictly dependent on the use of a light source (such as the IR emitters 28 and 68) to cause changes in hydrogen pressure at refill ($\Delta P_{FULL}$) and subsequent to refill ($\Delta P_{RUN}$), in that curves of the type shown in FIG. 7 can be generated by relying solely on heat, electric fields, or other energy source to cause hydrogen to be released from the storage media. As such, the process steps outlined in Table I could be modified to omit the operation of the IR emitters and rely instead on measured changes in pressure (both $\Delta P_{RUN}$ and $\Delta P_{FULL}$) during hydrogen desorption that occur at various elevated temperatures (e.g., $T_1$, $T_2$ and $T_3$ in FIG. 7) or when the storage media is subjected to electric field of various levels. Thereafter, hydrogen fill levels in the tank 10/50 could be assessed during periods of substantially constant demand by intermittently applying heat, electric fields, or other energy to the storage media, measuring the resulting pressure changes ($\Delta P_{RUN}$), and calculating a normalized value ($\Delta P_{RUN}/\Delta P_{FULL}$).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

The invention claimed is:

1. A method for determining the hydrogen fill level in a hydrogen storage tank containing a solid-state hydrogen storage media, the method comprising:

equipping the hydrogen storage tank with at least one compartment for storing the storage media, passages for transporting hydrogen gas to the hydrogen storage tank and into the compartment and for transporting hydrogen gas out of the compartment, and means for distributing heat within the compartment so as to establish a substantially uniform temperature in the storage media within the compartment;

generating a look-up table derived from a series of plots relating changes in pressure of the hydrogen gas in the hydrogen storage tank versus fill levels of hydrogen in the hydrogen storage tank as a function of temperature;

filling the hydrogen storage tank to full capacity by flowing hydrogen gas through the passages and into the compartment so as to adsorb hydrogen on the storage media;

causing hydrogen release from the storage media for a time period during which there is a substantially constant demand on the hydrogen storage tank;

measuring a change in pressure of the hydrogen gas released from the storage media during the time period; and then applying the look-up table to determine the hydrogen fill level in the hydrogen storage tank.

2. The method according to claim 1, wherein the look-up table is generated by:
   filling the hydrogen storage tank with hydrogen gas at predetermined fill levels by adsorbing the hydrogen gas on the storage media;
   heating the storage media to a plurality of temperatures and, at each of the temperatures and each of the predetermined fill levels, sensing the pressure of hydrogen gas desorbed from the storage media; and
   turning on a light source and sensing a change in the pressure of the hydrogen gas desorbed from storage media during a time period at each of the temperatures and each of the predetermined fill levels, the light source generating light at wavelengths to which the storage media is at least partially transparent and at which bonds between hydrogen and the storage media will absorb at least a portion of the light so as to promote the release of hydrogen gas from the storage media.

3. The method according to claim 2, wherein the light generated by the light source includes infrared wavelengths.

4. The method according to claim 1, further comprising:
   after filling the hydrogen storage tank, heating the storage media to a temperature and sensing the pressure of hydrogen gas released from the compartment; and
   turning on a light source for a time period and sensing a change in the pressure of hydrogen gas released from storage media, the light source generating light at wavelengths to which the storage media is at least partially transparent and at which bonds between hydrogen and the storage media will absorb at least a portion of the light so as to promote the release of hydrogen gas from the storage media.

5. The method according to claim 4, wherein the light generated by the light source includes infrared wavelengths.

6. The method according to claim 1, wherein hydrogen is released from the storage media during the time period when there is a substantially constant demand on the hydrogen storage tank by turning on a light source that generates light at wavelengths to which the storage media is at least partially transparent and at which bonds between hydrogen and the storage media will absorb at least a portion of the light so as to promote the release of hydrogen gas from the storage media.

7. The method according to claim 6, wherein the light generated by the light source includes infrared wavelengths.

8. The method according to claim 1, further comprising generating an electric field within the compartment.

9. The method according to claim 1, wherein heat is distributed in the compartment by flowing a coolant through at least one heat exchanger tube that passes through the compartment.

10. The method according to claim 9, wherein the at least one tube removes heat from the compartment during hydrogen adsorption.

11. The method according to claim 9, wherein the at least one tube imports waste heat from a fuel cell during hydrogen desorption.

12. The method according to claim 1, wherein the compartment is one of a plurality of compartments within the hydrogen storage tank.

13. The method according to claim 12, wherein the compartments are defined by boxes individually placed and stacked in parallel columns within the hydrogen storage tank.

14. The method according to claim 1, wherein the storage media is nano-porous silicon.

15. A method for determining the hydrogen fill level in a hydrogen storage tank containing a solid-state hydrogen storage media, the method comprising:
   equipping the hydrogen storage tank with at least one compartment for storing the storage media, passages for transporting hydrogen gas to the hydrogen storage tank and into the compartment and for transporting hydrogen gas out of the compartment, and means for distributing heat within the compartment so as to establish a substantially uniform temperature in the storage media within the compartment;
   filling the hydrogen storage tank to full capacity by flowing hydrogen gas through the passages and into the compartment so as to adsorb hydrogen on the storage media;
   heating the storage media to a temperature and sensing the pressure of hydrogen gas released from the compartment at the temperature;
   turning on a light source for a time period during which the storage media is at the temperature, the light source generating light at wavelengths to which the storage media is at least partially transparent and at which bonds between hydrogen and the storage media will absorb at least a portion of the light so as to promote the release of hydrogen gas from the storage media;
   sensing a change in the pressure of hydrogen gas released from storage media at the temperature while the light source is on;
   drawing hydrogen gas from the hydrogen storage tank;
   causing hydrogen release from the storage media for a time period during which there is a substantially constant demand on the hydrogen storage tank by turning on the light source;
   measuring a change in pressure of the hydrogen gas released from the storage media during the time period; and then
   comparing the measured change in pressure to a look-up table to determine the hydrogen fill level in the hydrogen storage tank, the look-up table being derived from a series of plots relating changes in pressure of the hydrogen gas in the hydrogen storage tank versus fill levels of hydrogen in the hydrogen storage tank as a function of temperature.

16. The method according to claim 15, wherein the look-up table is generated by:
   filling the hydrogen storage tank with hydrogen gas at predetermined fill levels by adsorbing the hydrogen gas on the storage media;
   heating the storage media to a plurality of temperatures and, at each of the temperatures and each of the predetermined fill levels, sensing the pressure of hydrogen gas desorbed from the storage media; and
   turning on a light source and sensing a change in the pressure of the hydrogen gas desorbed from storage media during a time period at each of the temperatures and each of the predetermined fill levels, the light source generating light at wavelengths to which the storage media is at least partially transparent and at which bonds between hydrogen and the storage media will absorb at least a portion of the light so as to promote the release of hydrogen gas from the storage media.

17. The method according to claim 15, wherein the light generated by the light source includes infrared wavelengths.

18. The method according to claim 15, further comprising generating an electric field within the compartment.

19. The method according to claim 15, wherein heat is distributed in the compartment by flowing a coolant through at least one heat exchanger tube that passes through the compartment.

20. The method according to claim 15, wherein the storage media is nano-porous silicon.

21. A hydrogen storage tank comprising:
a plurality of separate compartments within the hydrogen storage tank;
a solid-state hydrogen storage media within the compartments, the storage media being capable of adsorbing and desorbing hydrogen at surfaces thereof;
passages for transporting hydrogen gas to the hydrogen storage tank and into each of the compartments and for transporting hydrogen gas out of each of the compartments;
means for distributing heat within and among the compartments so as to establish a substantially uniform temperature in the storage media within the compartments;
means for desorbing hydrogen from the storage media; and
means for sensing the pressure of hydrogen gas released by desorption from the storage media within the compartments.

22. The hydrogen storage tank according to claim 21, further comprising:
a look-up table derived from a series of plots relating change in hydrogen gas pressure measured by the sensing means versus fill levels of hydrogen gas in the hydrogen storage tank as a function of temperature; and
means for utilizing the look-up table to determine the fill level of hydrogen gas in the hydrogen storage tank.

23. The hydrogen storage tank according to claim 21, further comprising a light source that generates light at wavelengths to which the storage media is at least partially transparent and at which bonds between hydrogen and the storage media will absorb at least a portion of the light so as to promote the release of hydrogen from the storage media.

24. The hydrogen storage tank according to claim 23, wherein the light generated by the light source includes infrared wavelengths.

25. The hydrogen storage tank according to claim 21, further comprising means for generating an electric field within the compartments.

26. The hydrogen storage tank according to claim 21, wherein the heat distributing means comprises heat exchanger tubes that pass through each of the compartments.

27. The hydrogen storage tank according to claim 21, wherein the compartments are defined within the hydrogen storage tank by dividers and the compartments are substantially parallel to each other.

28. The hydrogen storage tank according to claim 27, wherein the heat distributing means comprises heat exchanger tubes, each of the tubes individually passing through a corresponding one of the compartments.

29. The hydrogen storage tank according to claim 27, wherein each of the passages individually passes through a corresponding one of the compartments.

30. The hydrogen storage tank according to claim 21, wherein the compartments are defined by boxes individually placed and stacked in parallel columns within the hydrogen storage tank.

31. The hydrogen storage tank according to claim 30, wherein the heat distributing means comprises heat exchanger tubes, each of the tubes individually passing through a corresponding one of the columns.

32. The hydrogen storage tank according to claim 30, wherein each of the passages individually passes through a corresponding one of the columns.

33. The hydrogen storage tank according to claim 21, wherein the storage media is nano-porous silicon.

* * * * *